Patented July 21, 1953

2,646,444

UNITED STATES PATENT OFFICE 2,646,444

PRODUCTION OF ACRYLONITRILE BY CATALYTIC DEHYDRATION OF ETHYLENE CYANOHYDRIN

Erwin L. Carpenter, Stamford, Conn., assignor to American Cyanamid Company, New York, N. Y., a corporation of Maine No Drawing. Application July 7, 1951, Serial No. 235,668

12 Claims. (Cl. 260—465.9)

The present invention relates to the production of acrylonitrile. More specifically, the present invention relates to a process for the catalytic dehydration of ethylene cyanohydrin to acrylonitrile in the presence of novel dehydrating catalyst compositions comprising sodium formate and ethylene glycol. The invention further relates to such a process wherein the catalyst comprises an inert solid material in particulate form.

Acrylonitrile has been produced industrially for a number of years by a process wherein a stream of liquid ethylene cyanohydrin is fed into a volume of a dehydrating catalyst in a dehydration zone maintained at a critical temperature which varies for each catalyst but which usually is in the range 160° C.–240° C. Water, acrylonitrile, and some unreacted ethylene cyanohydrin are volatilized from the catalyst and pass into a fractionating column which condenses and returns undehydrated cyanohydrin. The acrylonitrile and water formed by the dehydration are discharged from the column and condense to a stratifiable distillate from which the acrylonitrile is readily recovered.

For this dehydration, the ethylene cyanohydrin may be raw or "crude" cyanohydrin as received from the reaction of ethylene oxide with hydrocyanic acid in equimolecular proportions, or a substantially pure ethylene cyanohydrin, hereinafter called "distilled" cyanohydrin, may be used. The former or crude material contains about 5% to 10% of water or more, and about 2% to 6% of dark polymers or residues of unknown composition which boil at temperatures above the boiling point of ethylene cyanohydrin, that is, above about 220° C. The latter or distilled cyanohydrin contains practically none of this dark material and about 1% to 2% of water.

Intensive study has developed several organic salt catalysts which, under laboratory trials with distilled ethylene cyanohydrin, have realized very high yields of acrylonitrile. Catalysts of this class are disclosed in U. S. Patent 2,461,492, of which I am coinventor, and the present invention is an improvement over the process of Example 4 thereof.

The improved results obtained by the use of sodium formate in accordance with the patent referred to were attended by a number of disadvantages. In the first place, this catalyst swelled and foamed excessively as the dehydration proceeded, and the use of anti-foaming agents, such as those described in my U. S. Patent 2,494,116, became necessary for optimum results.

Then, whether or not these anti-foaming agents were used, the period of maximum activity of the catalyst was attained only after the catalyst had passed through an induction period. This induction period was so lengthy that the volume of ethylene cyanohydrin which accumulated in the catalyst was often about three or more times the volume present when the catalyst was operating at its maximum efficiency. A variable evolution of acrylonitrile resulted as a consequence of this induction period, so that the fractionating column was difficult to control, particularly when the catalyst was used on an industrial scale.

Further, the temperature range of 205°–210° C. proved to be the optimum one. Maintenance of this temperature on an industrial scale was costly, and it was realized that if this temperature could be lowered by only 10°–15° C., the thermal requirements of the process would be considerably reduced.

Another drawback to the commercial adoption of sodium formate as the catalyst for the dehydration of both distilled and crude ethylene cyanohydrin was that under typical industrial operating conditions the catalyst became viscous. Since the heat necessary for the dehydration reaction is ordinarily supplied by circulating the catalyst through an exterior heat exchanger, pumping such viscous solutions became very difficult and almost impossible. Practically no decrease in this viscosity was achieved by the use of any of the anti-foaming agents mentioned above.

An important disadvantage resided in the fact that the dark high-boiling polymers or residues which crude ethylene cyanohydrin contains were found to have a deleterious effect both upon the yield of acrylonitrile and upon the life of the sodium formate catalyst. This particular difficulty was obviated by subjecting the crude ethylene cyanohydrin to a vacuum distillation which removed practically all the dark material. However, it was apparent that this distillation was an expedient, and that it would be preferable to discover a new catalyst composition suitable for the purpose.

The discovery has now been made that the above-noted disadvantages are substantially overcome when ethylene glycol, $HOCH_2CH_2OH$, is added to the sodium formate catalyst as will be hereinafter described.

The most immediately noticeable effect of this addition is markedly to reduce the prolonged induction period referred to above. That is, the addition of glycol causes the ratio between the maximum and minimum concentration of ethylene cyanohydrin in the dehydration zone to decrease from about 3 or 4 to 1, which prevails when sodium formate alone or sodium formate with an anti-foaming agent is used, to 2:1 or even less. Moreover, on evaluation of the data obtained during dehydrations carried out at the lower operating temperature of 195° C., very distinct increases in the overall yield become apparent, overall yields typically rising by about 5%.

A further beneficial effect of the glycol is to reduce the viscosity of the catalyst to the point where it can be pumped continuously and readily over the duration of its life.

The additional discovery has been made that even higher yields of acrylonitrile and improved catalyst lives are effected when a small amount of a solid, chemically unreactive material in particulate form is present in the sodium formate-ethylene glycol catalyst. When crude ethylene cyanohydrin is dehydrated in such a catalyst, the yield of acrylonitrile and the pounds of acrylonitrile produced per pound of sodium formate typically increase by about 4.5% and 20% respectively, as compared with dehydrations where the sodium formate-ethylene glycol catalyst itself is used. It is a particular advantage that by the use of glycol and particulate matter, as discussed above, it is possible to obtain substantially the same excellent yields of acrylonitrile from crude cyanohydrin as have been obtained heretofore from the distilled material.

More in detail, the sodium formate catalyst of the present invention is prepared by mixing sodium formate with a weight of ethylene glycol equal to roughly $\frac{1}{15}$ to $\frac{3}{4}$ and preferably $\frac{1}{4}$ to $\frac{3}{4}$ of the weight of the sodium formate. Handling of this mixture is facilitated by adding at least sufficient water to form a pumpable slurry. Upon completion of the mixing the catalyst is pumped into the ethylene cyanohydrin dehydration chamber, and is heated. As the water in the catalyst evaporates, ethylene cyanohydrin is added. Dehydration temperature is reached at roughly 150° C. and the operating temperature is in the range of 170°–210° C., but preferably is about 195° C.

The proportion of glycol used is not critical. As stated, best results are obtained when the weight of the glycol is $\frac{1}{4}$ to $\frac{3}{4}$ of the weight of the sodium formate, and it is a particular advantage of this range that the use of the anti-foaming agents of U. S. 2,494,116 becomes unnecessary. Larger proportions than $\frac{3}{4}$ may be used without harm but the small increase in efficiency thereby achieved is insufficient to justify the added expense. Less than $\frac{1}{4}$ down to about $\frac{1}{15}$ and lower may be used very advantageously, but in this low range, for maximum catalyst life the use of an anti-foaming agent becomes increasingly desirable.

The amount of inert solid material in particulate form is at least about 1% and is preferably about 10% (anhydrous basis) of the weight of the sodium formate. Such solids, if water-soluble, are customarily dissolved in the water-formate-glycol solution or slurry, and then precipitated when the water is evaporated. Alternatively, the solids may be added directly to the dehydrator, either before or after the catalyst has been heated to its operating temperature. The particulate solids disclosed in my copending application Serial No. 235,667 filed July 7, 1951 are suitable for this purpose; of these magnesium sulfate, sodium sulfate and aluminum sulfate are especially useful, although other solids including sand, and aluminum, stainless steel, ceramic, and vitreous particles may also be used. The size of the particles is not at all critical, and sizes ranging from the semi-colloidal such as that of aluminum hydroxide particles up to even ¼″ have been found useful on a commercial scale. The exact size of the solids and the maximum proportion of the solids to the formate depends primarily on the means employed for circulating and agitating the catalyst.

Ordinarily the use of more than 20% of particulate material (based on the weight of the formate) will yield a composition which cannot be pumped or stirred with sufficient facility, but an excess is not otherwise harmful. The effect of these particles is most beneficial during the latter half of the normal life of the catalyst, as discussed in my above-identified copending application.

The following examples of preferred embodiments illustrate but do not limit the present invention, which has been completely set forth above.

*Example 1*

A sodium formate catalyst is prepared by mixing the following:

| | Pounds |
|---|---|
| Sodium formate | 900 |
| Ethylene glycol | 500 |
| Water | 1350 |

The catalyst is pumped into the dehydration chamber of an ethylene cyanohydrin dehydration unit and is heated by circulation through an exterior heat exchanger. Ethylene cyanohydrin is slowly added as the water evaporates. Dehydration of ethylene cyanohydrin begins at about 150° C. and the catalyst is held at 195° C. for the balance of the run. The feed of ethylene cyanohydrin is maintained at the rate of 7 gal./min.

*Example 2*

A sodium formate catalyst is prepared by mixing the following:

| | Pounds |
|---|---|
| Sodium formate | 900 |
| Ethylene glycol | 500 |
| $MgSO_4 \cdot 7H_2O$ | 200 |
| Water | 1300 |

Thereafter the procedure of Example 1 is followed. When the water has been distilled off and dehydration temperature has been reached, magnesium salt crystals are suspended in the catalyst.

*Examples 3–8*

A series of comparative laboratory tests showing the effect of glycol alone and in combination with particulate matter was made in a reaction flask or dehydrator equipped with a stirrer, dropping funnel and distillation column, the lower part of which served as a fractionating column and returned unchanged cyanohydrin to the catalyst. The flask was heated by means of a Wood's metal bath. The catalyst was placed in the reaction flask, and polymer-free distilled ethylene cyanohydrin ("DECH") was used throughout as the raw material. The ethylene cyanohydrin was added dropwise at the rates shown. A distillate of acrylonitrile and water was collected from the distillation column, which was analyzed for its acrylonitrile ("AN") content. During Examples 3–7 a determination was made of the maximum amount of ethylene cyanohydrin present in the catalyst during the induction period and also of the minimum amount present in the catalyst thereafter.

The catalysts of Examples 5-8 were considerably more fluid and easier to stir than the catalysts of Examples 3 and 4.

Results were as follows:

| Ex. | Catalyst Composition, Gm. | | | | DECH Fed | | Cat. Temp., °C [b] | Yield of AN | | Gm. ECH in Catalyst | |
|---|---|---|---|---|---|---|---|---|---|---|---|
| | HCOONa | Glycol | Anti-foam [a] | Solid | Total | Rate | | (b) Percent | Lb. AN per lb. HCOONa | Max. | Min. |
| 3 | 50 | None | None | None | [c] 8.5 | [d] 3.0 | 195 | 95.0 | 8.6 | 169 | [e] 130 |
| 4 | 50 | None | 5.0 | None | 31.1 | 3.5 | 195 | 92.1 | 30.4 | 168 | 60 |
| 5 | 50 | 25 | None | None | 31.1 | 3.5 | 195 | 96.7 | 31.9 | 71 | 35 |
| 6 | 50 | 25 | None | (f) | 31.1 | 3.5 | 195 | 98.2 | 32.4 | 71 | 35 |
| 7 | 50 | 25 | None | (g) | 31.1 | 3.5 | 195 | 97.8 | 32.2 | 66 | 33 |
| 8 | 50 | 12.5 | None | None | 28.0 | 3.5 | 190 | 96.2 | 28.6 | | |

[a] Monomethyl ether of tripropylene glycol.
[b] Based on ethylene cyanohydrin content of feed.
[c] Gram-mols.
[d] Gm. per minute.
[e] Catalyst foamed over; run discontinued.
[f] 9 g. of aluminum chips.
[g] 10 g. of sand.

Examples 9-11

Three comparative large-scale tests were made in an industrial ethylene cyanohydrin dehydration unit comprising a dehydration chamber surmounted by a fractionating column. Heat was supplied by continuously circulating the catalyst through an exterior heat exchanger. In each of the runs a crude ethylene cyanohydrin ("CECH") containing about 84% by weight of ethylene cyanohydrin, 12% water and the balance polymer was used at the uniform feed rate of 7 gal./min., and the catalyst was maintained at 195° C. throughout the run. Results were as follows:

| Example | Catalyst Composition, Lb. | | | | Total CECH Fed, Gallons | Yield of AN | |
|---|---|---|---|---|---|---|---|
| | HCOONa | Glycol | Anti-Foam [a] | Solids | | (c) Percent | Lb. AN per lb. HCOONa |
| 9 | 900 | None | 63 | None | 4,230 | 87.5 | 22.6 |
| 10 | 900 | 500 | None | None | 4,280 | 93.2 | 23.4 |
| 11 | 900 | 500 | None | [b] 200 | 4,863 | 97.4 | 28.0 |

[a] Monomethyl ether of tripropylene glycol.
[b] $MgSO_4 \cdot 7H_2O$.
[c] Based on ethylene cyanohydrin content of feed.

In Example 9, circulation of the catalyst mass through the external heat exchanger was difficult to maintain, and at times the pump failed completely, whereas circulation was maintained without difficulty throughout Examples 10 and 11.

I claim:

1. A method of producing acrylonitrile which includes feeding a liquid ethylene cyanohydrin to a dehydrating zone heated to a temperature within the range from about 170° C. to about 210° C., said zone containing sodium formate as an ethylene cyanohydrin dehydration catalyst and ethylene glycol, removing acrylonitrile and water from said zone, and recovering the acrylonitrile.

2. A method according to claim 1 in which the weight of ethylene glycol is about ¼ to ¾ of the weight of the sodium formate.

3. A method according to claim 2 wherein the catalyst in the dehydration zone includes an inert solid material in particulate form.

4. A method according to claim 3 wherein the temperature is about 195° C.

5. A method according to claim 4 wherein the weight of the ethylene glycol and the weight of the inert particulate material are respectively about ½ and 1/10 of the weight of the sodium formate.

6. A method according to claim 1 wherein the cyanohydrin is crude ethylene cyanohydrin.

7. A method according to claim 6 wherein the weight of the ethylene glycol is about ¼ to ¾ of the weight of the sodium formate.

8. A method according to claim 7 wherein the catalyst in the dehydration zone includes an inert solid material in particulate form.

9. A method according to claim 8 wherein the dehydration temperature is about 195° C.

10. A method according to claim 9 wherein the weight of the ethylene glycol and the weight of the inert particulate material are respectively about ½ and 1/10 of the weight of the sodium formate.

11. In the preparation of acrylonitrile by thermal dehydration of ethylene cyanohydrin, the improvement which comprises: contacting liquid ethylene cyanohydrin with a catalyst composition comprising sodium formate and ethylene glycol at a temperature from about 170° C. to about 210° C.

12. In the preparation of acrylonitrile by thermal dehydration of crude ethylene cyanohydrin, the improvement which comprises: contacting liquid crude ethylene cyanohydrin with a catalyst composition comprising sodium formate, ethylene glycol and an inert particulate material at a temperature from about 170° C. to about 210° C.

ERWIN L. CARPENTER.

References Cited in the file of this patent

UNITED STATES PATENTS

| Number | Name | Date |
|---|---|---|
| 2,436,774 | Nutting et al. | Feb. 24, 1948 |
| 2,461,492 | Carpenter et al. | Feb. 8, 1949 |
| 2,494,116 | Carpenter | Jan. 10, 1950 |
| 2,500,403 | Davis et al. | Mar. 14, 1950 |
| 2,503,710 | Bruson | Apr. 11, 1950 |